Patented Sept. 6, 1932

1,876,065

UNITED STATES PATENT OFFICE

WILLIAM BASIL LLEWELLYN AND SYDNEY FRANCIS WILLIAM CRUNDALL, OF MANCHESTER, ENGLAND, ASSIGNORS TO PETER SPENCE & SONS, LIMITED, OF MANCHESTER, ENGLAND

PREPARATION OF TITANIUM COMPOUNDS

No Drawing. Application filed April 26, 1926, Serial No. 104,838, and in Great Britain May 8, 1925.

The preparation of titanic hydrate, meta or orthotitanic acid, or highly basic sulphate of titanium by precipitation from a solution of a titanic salt e. g., titanic sulphate, is well known.

Titanium phosphate is stated to have been precipitated as white voluminous flocks by mixing phosphoric acid with titanic chloride solution, any $Fe_2O_3$ in solution being completely precipitated with it, the precipitate drying up to a shining gummy mass. A basic titanic phosphate of the formula

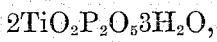
$$2TiO_2.P_2O_5.3H_2O,$$

containing some ammonia, is stated to have been prepared in a gelatinous form by precipitating titanic solutions containing hydrochloric acid with ammonium phosphate. Such gelatinous precipitates are however difficult to filter, wash and dry, and would be particularly disadvantageous on a technical scale. It has also been proposed to mix together titanium hydrate with phosphoric acid or a phosphate and calcine the mixture for use as a pigment.

Now we have found that we are able to prepare a hitherto undescribed precipitated hydrated basic titanic phosphate in a readily filterable and washable form, substantially free from undesirable impurities and particularly from iron, in the form of a very finely divided but granular and readily filterable precipitate and which on drying is neither gummy nor horny but easily friable, by treating a solution of titanic salt with phosphoric acid or a suitable phosphate, under the conditions relating to concentration, temperature, gradual mixing and free acidity of the solution, which are hereinafter generally indicated; also that the hydrated basic titanic phosphate thus produced, after drying and calcining, and either alone or mixed at any stage with other desired substances, makes a white pigment of excellent hiding power, and our invention consists in such preparation and use of hydrated basic titanic phosphate.

We find that if the concentration of the titanium solution is excessive the precipitate formed by addition of the phosphate is gelatinous and difficult to filter and wash and to avoid this the concentration of $TiO_2$ in the case e. g., of the employment of titanic sulphate solution free from suspended matter should not exceed about 5% by volume, and may advantageously be considerably lower, e. g., a concentration of 2.5% $TiO_2$ in such a solution gives good results. The temperature of precipitation should be 50° C. or higher and increasing the temperature of the reacting solution above this figure considerably improves the filterability of the precipitate. In some cases the best results may be obtained by raising the temperature to boiling point. The presence of a finely divided substance such as barium sulphate in suspension assists in the same direction and also enables a more concentrated titanium solution to be employed whilst still obtaining the desired filterable precipitate. Such substances are only permitted when their presence in the final product is advantageous or not detrimental. The presence of chlorides e. g., NaCl or hydrochloric acid also assists in the production of a filterable product whereas the presence of sulphates operates in the reverse direction. It is also inadvisable to bring about the reaction too suddenly, as this tends to produce a gelatinous product, therefore we prefer to mix the phosphate with the titanium solution gradually under agitation. The mixing may be effected by adding the phosphate to the titanic solution or vice versa. When the titanic solution is added gradually to a solution of a phosphate we find it feasible to use a more concentrated titanic solution than when the mixing is done in the reverse direction. In some such cases, where the various other conditions as aforesaid are favourable for the production of a readily filterable product, such concentration may be even as high as about 10% $TiO_2$ by volume. In order to maintain undesirable impurities such as salts of iron or chromium in solution it is necessary to have free acid present and we find that this may be present in considerable proportion—in considerably greater proportion than e. g., is usually practicable in the case of the precipitation of basic sulphate of titanium—without preventing the desired precipitation, though if such concentration of acid be very excessive the precipitation may be diminished or prevented. In such a case the desired precipitation may be brought about, provided other indicated conditions are observed, by adding a suitable neutralizing agent e. g., sodium carbonate to the required extent.

If it be desired to obtain a mixed product of basic titanic phosphate with some other suitable substance e. g., barium sulphate, or calcium sulphate constituting what may be termed a base pigment, this may advantageously be obtained by carrying out the precipitation in the presence of the said other desired base pigment or by precipitating it together with the basic titanic phosphate or before the latter is precipitated.

In carrying our invention into effect we may e. g., proceed as follows:—We take a solution of a titanium salt, suitably titanic sulphate or chloride, (with any iron it contains in either the ferrous or ferric state) containing e. g., about 5% to 1% $TiO_2$ or even less and free acid (which may be partly or entirely hydrochloric acid) equivalent to about 3% to 15% $SO_3$, at a temperature of say 80° C. to 100° C. and gradually add to it, under agitation a solution of sodium phosphate or phosphoric acid sufficient to provide in excess of 1 molecule $P_2O_5$ for each 3 molecules $TiO_2$. Under such conditions practically the whole of the titanium is precipitated in the desired form, but little excess phosphate being necessary; soluble impurities e. g., iron and chromium salts in the titanium solution are almost entirely retained in the mother liquor which is removed by filtering and washing whereby the precipitate is obtained substantially pure. The precipitate made according to this example has a composition closely approximating to $3TiO_2.P_2O_5.6H_2O$. The precipitate may then be dried and calcined completely to remove the combined water and, if necessary, after grinding, used as a white pigment.

Or, if we desire to make a mixed product as aforesaid, we may e. g., take a solution of a titanium salt, suitably titanic sulphate or chloride, containing e. g., about 5% to 1% $TiO_2$ and free acid (which may be partly or entirely hydrochloric acid) equivalent to about 3% to 15% $SO_3$ at a temperature of say 80° C.–100° C. and gradually add to it, in the case of the sulphate solution, preferably simultaneously, solutions of barium chloride and of sodium phosphate or phosphoric acid sufficient to provide in excess of 1 molecule $P_2O_5$ for each 3 molecules $TiO_2$. We prefer to add such a quantity of barium chloride as shall, by its double decomposition with the sulphate, yield a final calcined product containing up to about 60% $BaSO_4$ and not less than about 25% $TiO_2$.

In the case of the chloride solution we may add barium sulphate, suitably in a pure white finely divided form and in such quantity as shall yield e. g. a final calcined product containing up to about 60% $BaSO_4$ and not less than about 25% $TiO_2$, or we may add sulphuric acid or a suitable sulphate to the titanium chloride solution and add barium chloride to precipitate barium sulphate as indicated earlier, before adding the phosphate or phosphoric acid. Under such conditions we obtain a thorough admixture of the barium sulphate and titanium phosphate in the desired form, easily separable from impurities, and which after filtering, washing, drying and calcining to remove the combined water and if necessary after grinding may be used as a white pigment. The washing of the precipitates may advantageously be performed firstly by decantation and finally or a filter, with water. We prefer to calcine the product at the minimum temperature and for the minimum time necessary to drive off all the combined water as we find an excessively high temperature may cause discolouration.

The preparation and use as indicated of precipitated basic titanium phosphate has material advantages in the manufacture of white titanium pigments. It forms either alone or in conjunction with other suitable substances, a precipitate separable with unusual facility and in a high degree of purity from solutions which may be of considerable impurity; the titanium may also be more completely precipitated in spite of which it possesses a good colour, form impure solutions, than is frequently the case when basic sulphate or hydrated oxides of titanium are precipitated; the fact that the basic phosphate may be precipitated from solutions of much higher acidity than in the case of basic sulphate of titanium further tends to the elimination of impurities; and the final product has very good covering power after calcination.

What we claim as our invention and desire to secure by Letters Patent is:—

1. A process for the preparation of precipitated hydrated basic titanic phosphate in a readily filterable and washable form, which consists in gradually mixing a suitable phosphate solution with a solution of a titanic salt having a concentration less than 10% of $TiO_2$ by volume, and maintaining the solutions at a temperature of not less than about 50° C. during the mixing.

2. In the process claimed in claim 1, carrying out the precipitation in the presence of a base pigment, whereby an intimately mixed product containing precipitated hydrated basic titanic phosphate together with said other base pigment is obtained in a readily filterable and washable form, substantially as hereinbefore described.

3. In the process claimed in claim 1, precipitating a base pigment together with the basic titanic phosphate whereby an intimately mixed product containing precipitated hydrated basic titanic phosphate together with said other base pigment is obtained in a readily filterable and washable form, substantially as hereinbefore described.

4. In the process claimed in claim 1, carrying out the precipitation in the presence of free acid to maintain in solution impurities, substantially as hereinbefore described.

5. In the process claimed in clam 1, carrying out the precipitation in the presence of chlorides whereby the filterability of the product is improved, substantially as hereinbefore described.

6. The process of preparing a basic titanic phosphate which consists in gradually adding a suitable phosphate solution to a solution of a titanium salt containing not more than 10 percent $TiO_2$, and free acid equivalent to about 3 to 15 percent $SO_3$, the said phophate solution being sufficient to provide more than one molecule of $P_2O_5$ for each three molecules of $TiO_2$, agitating the titanium solution during the addition of the phosphate solution to procure a thorough mixing of the solutions, and maintaining the solutions at a temperature above 50° C.

In witness whereof we have hereunto set our hand.

WILLIAM BASIL LLEWELLYN.
SYDNEY FRANCIS WILLIAM CRUNDALL.